United States Patent
Borzi

[11] 3,773,133
[45] Nov. 20, 1973

[54] STEERING MECHANISM FOR ARTICULATED VEHICLE
[75] Inventor: Albert Borzi, Euclid, Ohio
[73] Assignee: General Motors Corporation, Detroit, Mich.
[22] Filed: Sept. 20, 1972
[21] Appl. No.: 290,452

[52] U.S. Cl. ............................ 180/79.2 B, 280/469
[51] Int. Cl. .............................................. B62d 5/10
[58] Field of Search .................... 180/79.2 B, 51; 280/464, 469

[56] References Cited
UNITED STATES PATENTS
2,535,927  12/1950  Hyler ......................... 180/79.2 B X
2,917,125  12/1959  Donner et al. ................. 180/79.2 B Primary Examiner—Benjamin Hersh
Assistant Examiner—John A. Pekar
Attorney—William S. Pettigrew et al.

[57] ABSTRACT

A steering mechanism for an articulated vehicle having a two-wheeled tractor unit and a trailing unit which is pivotally interconnected about a vertical steering axis for relative steering articulation therebetween to either side of straight-ahead alignment of the units. The steering mechanism includes a steering frame which houses a pinion fixed with the trailing unit and supports a pair of double-acting hydraulic steering cylinders, each of which has a piston formed with a rack which meshes with the pinion. Each steering cylinder is rigidly supported at its forward end by the steering frame while the rack is maintained in engagement with the pinion by a guide block that is located in transverse alignment with the pinion for maintaining engagement between the gear teeth of the rack and pinion.

2 Claims, 6 Drawing Figures

3,773,133

PATENTED NOV 20 1973 3,773,133

SHEET 2 OF 2

STEERING MECHANISM FOR ARTICULATED VEHICLE

This invention concerns a steering mechanism and more particularly a steering arrangement which is suitable for an articulated type vehicle such as an earthmoving scraper. Copending patent application Ser. No. 290,453, filed Sept. 20, 1972 entitled "Steering Mechanism For Articulated Vehicle," in the name of Janis Mazzarins and assigned to the assignee of this invention concerns a rack and pinion steering mechanism that includes a pair of hydraulic steering cylinders located along axes which are positioned generally parallel to the longitudinal axis of the vehicle. Each of the steering cylinders has the base end thereof pivotally supported by the associated frame member of the scraper while the rack is maintained in engagement with the pinion by a guide roller having a pair of radially extending flanges.

This invention concerns a steering mechanism which is similar to the steering mechanism of the aforementioned patent application and is characterized by having an L-shaped steering frame which has the base thereof formed with a completely enclosed chamber. The chamber is defined by a top wall, a bottom wall, a pair of side walls, a front wall, and a rear wall. The top and bottom walls are located in vertically spaced horizontal planes and each has an opening formed therein with the center of each opening being located along a vertical steering axis. An end cap is secured to the bottom wall for closing the opening therein and a cage member is located in the opening in the top wall. A shaft extends through the cage member and is supported for rotation relative to the steering frame about the vertical steering axis by bearing means carried by the cage member and the end cap. A pinion is splined to the shaft between the cage member and the end cap and a portion of the shaft is located above the top wall and adapted to be secured to the trailing unit. The steering mechanism also includes a pair of double-acting hydraulic steering cylinders each having a pair of relatively reciprocable piston and cylinder members. Each piston member has a piston head rigidly secured to a piston rod which is formed with a rack. Each cylinder member is closed at its rear end and has a mounting member rigidly secured to its forward end for sealingly engaging the piston rod and guiding the latter for movement along the longitudinal center axis of the steering cylinder. A pair of laterally spaced apertures are formed in the rear wall and the mounting members of the cylinder members are secured to the rear wall so the piston rod of each steering cylinder extends through one of the apertures and the rack associated therewith engages the pinion along an axis parallel to the longitudinal axis of the steering frame. In addition a guide block is carried by each side wall and has a groove formed therein for accommodating the rack and maintaining the latter in mesh with the pinion during operation of the steering cylinders.

The objects of the present invention are to provide a rack and pinion type steering mechanism for an articulated vehicle that includes a steering frame constructed so as to facilitate assembly of the various parts of the mechanism; to provide a rack and pinion steering arrangement for an articulated vehicle which includes a pair of double-acting hydraulic steering cylinders removably supported at the forward end thereof by a steering frame having a closed chamber formed therein; to provide a steering frame for a rack and pinion steering arrangement that has a rear wall for rigidly carrying the steering cylinders and a pair of side walls for supporting guide blocks which maintain the racks of the steering cylinders in mesh with the pinion; and to provide a rack and pinion steering mechanism in which the rack of each steering cylinder is guided by a plastic member formed with a groove that is complementary in configuration to the outer surface of the rack.

Other objects and advantages of the present invention will be apparent from the following detailed description when taken with the drawings in which.

Figure 1:
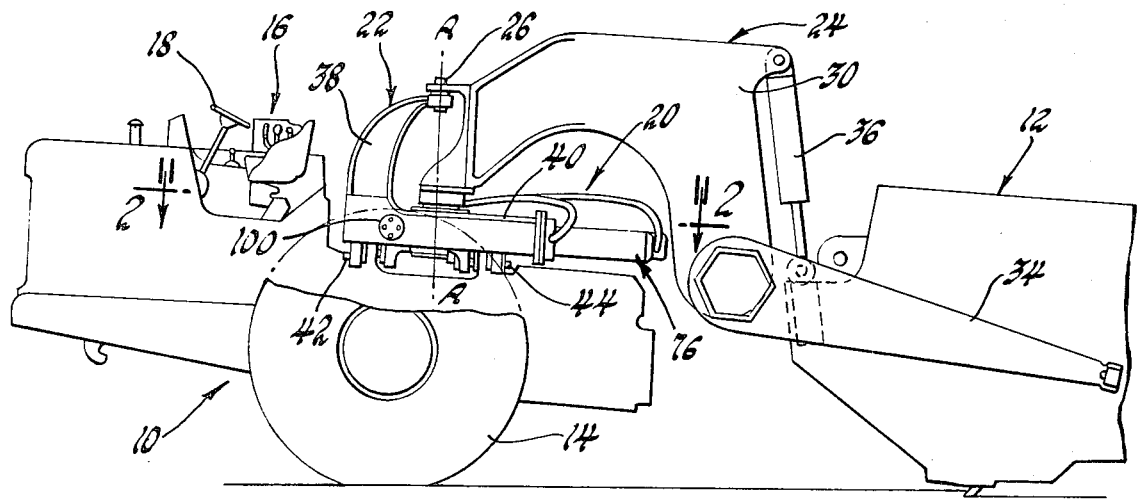
FIG. 1 is a side elevational view showing an articulated vehicle incorporating a steering mechanism made according to the invention.

Referring to the drawings and more particularly FIG. 1 thereof, an off-highway earthmoving vehicle is shown comprising the usual overhung tractor unit 10 and a trailing scraper bowl unit 12. The tractor unit 10 is supported by a pair of laterally spaced drive wheels, one of which is indicated by the reference numeral 14 and includes the usual operator's station 16 having a steering wheel 18 for controlling articulation of the tractor 10 relative to the scraper bowl unit 12. In this regard, steering is provided by a steering mechanism 20 which is carried by the tractor 10 above the rotational axis of the wheel 14 and is combined with a steering frame 22 and a pull-yoke assembly 24 the latter of which extends rearwardly and supports the scraper bowl unit 12. The steering mechanism 20 serves to provide for relative steering articulation of the tractor unit 10 relative to the scraper bowl unit 12 about a vertical steering axis A—A which extends through the longitudinal centers of an upper shaft or king-pin 26 and lower shaft or king-pin 28. The king-pins 26 and 28 serve to connect the pull-yoke assembly 24 to the steering frame 22.

More specifically, the pull-yoke assembly 24 includes the usual gooseneck which comprises a pair of diverging arms 30 and 32 extending rearwardly and downwardly for rigid connection with a transverse torque tube (not shown), the opposite ends of which support a pair of laterally spaced pull-arms, one of which is indicated by the reference numeral 34. As is conventional, the pull-arms extend rearwardly for pivotal connection with the side wall of the scraper bowl unit 12 and serve as support means during movement of the scraper bowl unit 12 between a lowered-dig position and a raised-carry position as provided by double-acting hydraulic bowl cylinders 36, one of which is shown extending between the upper rear portion of the gooseneck and the front end of the scraper bowl unit 12.

The steering frame 22 is generally of an L-shape and includes a vertically extending arm 38 and a rearwardly extending horizontal base section 40 connected to the frame of the tractor unit 10 by a pair of longitudinally aligned and horizontally extending pivotal connections 42 and 44. This arrangement permits the tractor unit 10 to oscillate relative to the steering frame 22 as well as the scraper bowl unit 12 about a longitudinally extending horizontal axis defined by the pivotal connections 42 and 44 so as to permit the vehicle to traverse irregular terrain.

As best seen in FIGS. 2 through 6, the base section 40 of the steering frame has an oil-filled chamber 46 formed therein which is defined by a top wall 48, a bottom wall 50, a pair of side walls 52 and 54, a front wall 56, and a rear wall 58. The top and bottom walls 48 and 50 are located in vertically spaced horizontal planes and are respectively formed with openings 60 and 62 the center of each of which is located along the steering axis A—A. An end cap 64 is secured to the bottom wall 50 through an adapter ring 66 and serves to close the opening 62 while a cage member 68 is fixed with the top wall 48 and located in the opening 60.

The king-pin 28 extends through the cage member 68 and is supported for rotation relative to the steering frame 22 about the vertical steering axis A—A by tapered bearings 70 and 72 respectively carried by the cage member 68 and the end cap 64. It will be noted that the king-pin 28 has its upper end and a portion adjacent its lower end formed with splines. Moreover, a pinion 74 is splined to the latter mentioned portion of the king-pin 28 substantially midway between the cage member 68 and the end cap 64 while the upper end of the king-pin 28 is located above the top wall 48 and is secured through the splines to the pull-yoke frame member 24.

Figure 2:
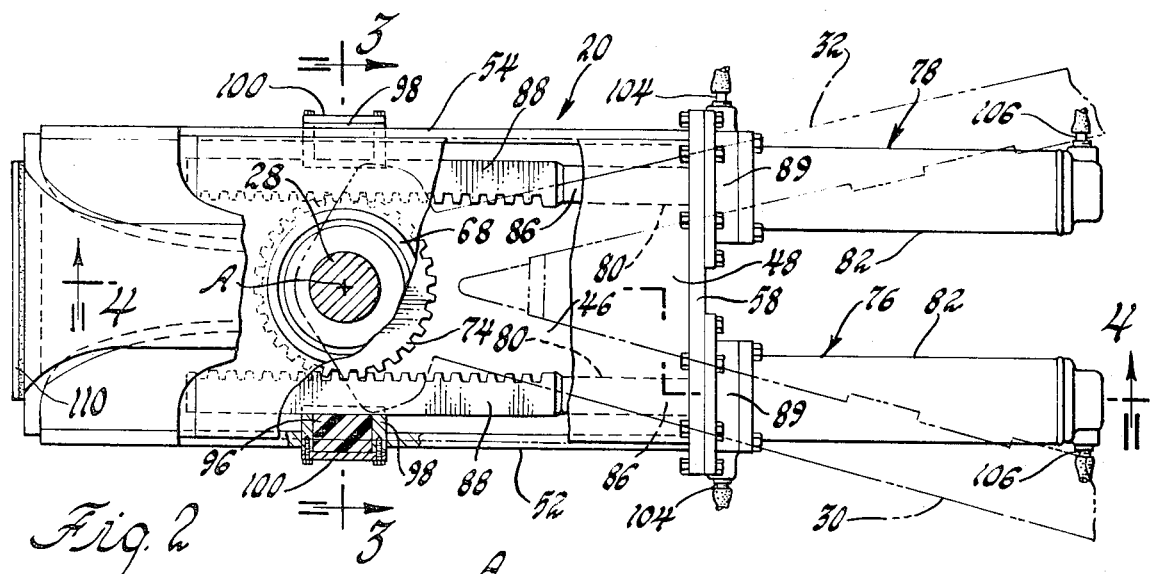
FIG. 2 is an enlarged view taken on line 2—2 of FIG. 1 and showing the steering mechanism of FIG. 1.
Figure 3:
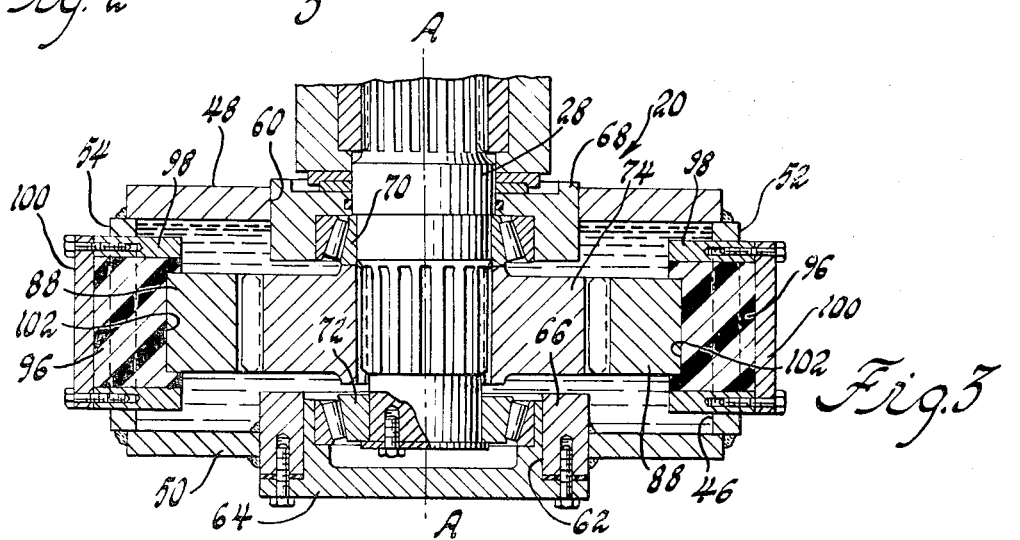
FIG. 3 is a further enlarged view of the steering mechanism taken on line 3—3 of FIG. 2.
Figure 4:
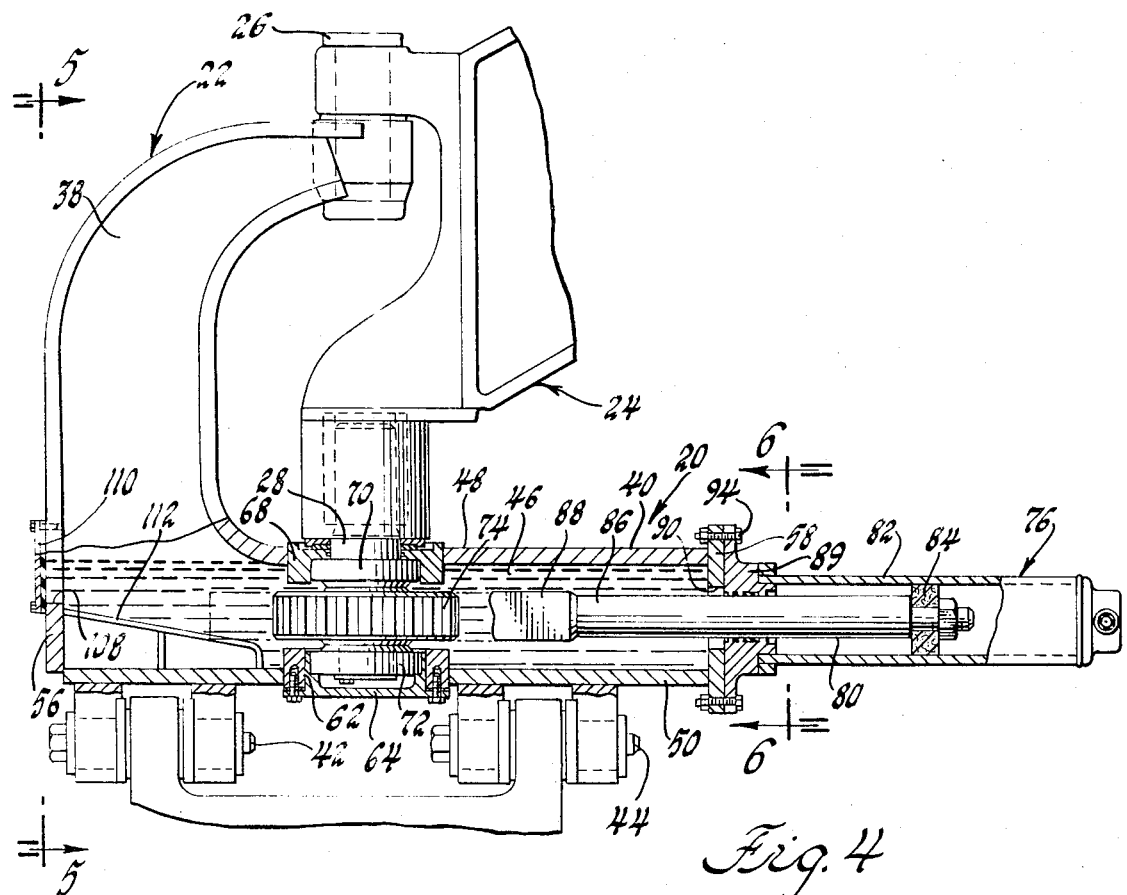
FIG. 4 is a view partly in section taken on line 4—4 of FIG. 2.
Figure 5:
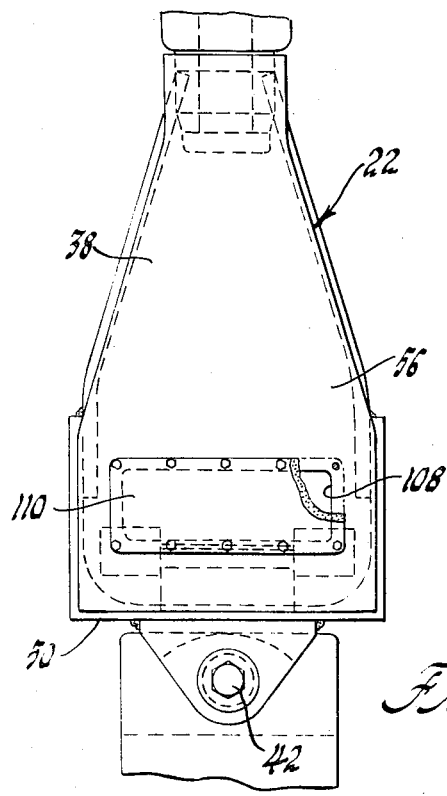
FIG. 5 is a front end view of the steering mechanism taken on line 5—5 of FIG. 4.
Figure 6:
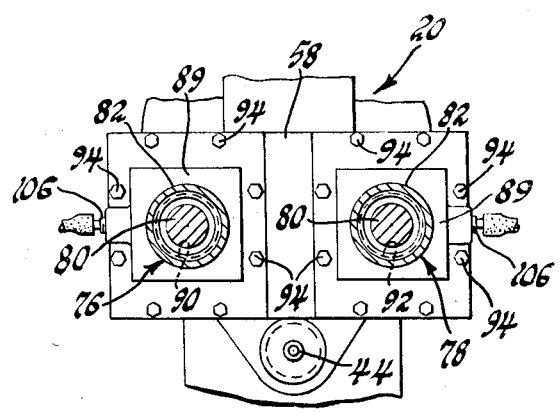
FIG. 6 is a rear end view of the steering mechanism taken on line 6—6 of FIG. 4.

The steering mechanism 20 also includes a pair of double-acting hydraulic steering cylinders 76 and 78 each of which has a pair of relatively reciprocable piston and cylinder members 80 and 82, respectively. As seen in FIG. 4, each piston member 80 has a piston head 84 rigidly secured to a piston rod 86. A rack 88 is formed with the piston rod 86 in axial alignment therewith and each cylinder member 82 is closed at its rear end while the front end of each cylinder member rigidly supports a mounting member 89 which sealingly engages the piston rod 86 and serves to guide the latter for movement solely along the longitudinal center axis of the steering cylinder. It will be noted that a pair of laterally spaced apertures 90 and 92 are formed in the rear wall 58 and a plurality of threaded fasteners 94 secure the mounting members 89 of cylinder members 82 to the rear wall 58 so the piston rods 86 of the steering cylinders extend through the apertures 90, 92 and the racks 88 engage the pinion 74 on opposite sides thereof along axes parallel to the longitudinal axis of the steering frame. In addition, as seen in FIGS. 2 and 3, a guide block 96 is carried by each side wall 52 and 54 at a point located along an axis perpendicular to the longitudinal axis of the steering frame 22 and passing through the vertical steering axis A-A. The guide block 96 is made from a plastic material such as polyurethane of sufficient hardness to offset any outward pressure of the rack and is supported within a cylindrical housing 98 secured to the associated side wall. The housing 98 is closed at its outboard end by a cap 100 which is removably secured to the housing 98 and can be combined with shims for properly positioning the guide block 96 relative to the pinion 74. As can be seen, the inner end of each guide block 96 has a U-shaped groove 102 formed therein for accommodating the rack 88 and maintaining the latter in mesh with the pinion 74 during operation of the steering cylinders. The groove 102 has a mutually perpendicular planar surfaces which are complementary to the outer configuration of the rack 88.

Although not shown, it will be noted that a suitable hydraulic steering system is provided which includes appropriate valving for permitting movement of the steering wheel 18 to result in pressurized fluid being directed to one end or the other of each steering cylinder 76 and 78 while exhausting the other end through the fittings 104 and 106. In addition, it will be noted that an oblong opening 108 is provided in the front wall 56 that is sealingly closed by a cover 110. The opening 108 serves as an access door to the chamber 46 and permits easy removable and entrance of the pinion 74 during assembly of the steering mechanism. A ramp 112 secured to the bottom wall 50 facilitates the insertion and removal of the pinion 74 by serving as a support along which the pinion can be slid from one position to another.

From the above description and as seen in FIG. 2, it should be apparent that by expanding steering cylinder 76 while contracting steering cylinder 78, the tractor unit 10 will be rotated relative to the trailing scraper bowl unit 12 in a clockwise direction about the steering axis A—A. This occurs because the pinion 74 is fixed with the scraper bowl unit 12 and, accordingly, the latter, being the heavier of the two sections of the vehicle, serves as a reaction member causing each rack 88 to, in effect, walk around the pinion 74 during actaution of the steering cylinders.

Various changes and modifications can be made in this construction without departing from the spirit of the invention. Such changes and modifications are contemplated by the inventor and he does not wish to be limited except by the scope of the appended claims.

I claim:

1. In combination with an articulated vehicle having a tractor unit and a trailing unit, a steering assembly between said tractor unit and said trailing unit and including a steering mechanism for providing relative steering articulation about a vertical steering axis between said units, said steering assembly including a steering frame mounted on the tractor unit for hingedly connecting the latter to the trailing scraper unit along said vertical steering axis and including a base portion, said base portion having a chamber formed therein defined by a top wall, a bottom wall, a pair of side walls, a front wall, and a rear wall, the top and bottom walls being located in vertically spaced horizontal planes and each having an opening therein with the center of each opening located along said vertical steering axis, an end cap secured to the bottom wall and closing the opening therein, a cage member fixed with the top wall and located in the opening formed therein, a shaft extending through said cage member and supported for rotation relative to the steering frame about the vertical steering axis by a bearing means carried by said cage member and said end cap, a pinion fixed with said shaft between the cage member and the end cap, said shaft adapted to be secured to the trailing unit, a pair of double-acting hydraulic steering cylinders each having a pair of relatively reciprocable piston and cylinder members, each piston member having a piston head rigidly secured to a piston rod, a rack formed with the piston rod in axial alignment therewith, each cylinder member being closed at one end and having a mounting member rigidly secured to the other end thereof for sealingly engaging said piston rod and guiding the latter for movement solely along the longitudinal center axis of the steering cylinder, a pair of laterally spaced apertures formed in said rear wall, means securing the mounting members of said cylinder members to said rear wall so the piston rod of each steering cylinder extends through one of said apertures and the rack associated therewith engages the pinion along an axis parallel to the longitudinal axis of the steering frame, and a guide block carried by each side wall and having a groove formed therein for accommodating the rack and maintaining the latter in mesh with the pinion during operation of the steering cylinders.

2. In combination with a scraper vehicle having a two-wheeled tractor unit and a trailing scraper unit, a steering assembly located between said tractor unit and said trailing scraper unit and including a steering mechanism for providing relative steering articulation about a vertical steering axis between said units, said steering assembly including an L-shaped steering frame mounted on the tractor unit for hingedly connecting the latter to the trailing scraper unit along said vertical steering axis and comprising a vertically extending arm and a rearwardly extending horizontal base, said base having a chamber formed therein defined by a top wall, a bottom wall, a pair of side walls, a front wall, and a rear wall, the top and bottom walls being located in vertically spaced horizontal planes and each having an opening therein with the center of each opening located along said vertical steering axis, an end cap secured to the bottom wall and closing the opening therein, a cage member fixed with the top wall and located in the opening formed therein, a shaft extending through said cage member and supported for rotation relative to the steering frame about the vertical steering axis by a bearing means carried by said cage member and said end cap, a pinion splined to said shaft substantially midway between the cage member and the end cap, a portion of said shaft being located above the top wall and adapted to be secured to the trailing unit, a pair of double-acting hydraulic steering cylinders each having a pair of relatively reciprocable piston and cylinder members, each piston member having a piston head rigidly secured to a piston rod, a rack formed with the piston rod in axial alignment therewith, each cylinder member being closed at one end and having a mounting member rigidly secured to the other end thereof for sealingly engaging said piston rod and guiding the latter for movement along the longitudinal center axis of the steering cylinder, a pair of laterally spaced apertures formed in said rear wall, means securing the mounting members of said cylinder members to said rear wall so the piston rod of each steering cylinder extends through one of said apertures and the rack associated therewith engages the pinion along an axis parallel to the longitudinal axis of the steering frame, and a guide block carried by each side wall at a point located along an axis perpendicular to said longitudinal axis of the steering frame and passing through the vertical steering axis, said guide block being made of a plastic material and having a U-shaped groove formed therein for accommodating the rack and maintaining the latter in mesh with the pinion during operation of the steering cylinders.

* * * * *